(12) United States Patent
Eckberg et al.

(10) Patent No.: US 6,610,760 B2
(45) Date of Patent: Aug. 26, 2003

(54) RADIATION CURABLE SILICONE COMPOSITION

(75) Inventors: Richard Paul Eckberg, Saratoga Springs, NY (US); Kesheng Feng, Bowling Green, OH (US); Douglas Neckers, Perrysburg, OH (US)

(73) Assignee: General Electric Company, Schenectady, NY (US)

( * ) Notice: Subject to any disclaimer, the term of this patent is extended or adjusted under 35 U.S.C. 154(b) by 9 days.

(21) Appl. No.: 09/908,157

(22) Filed: Jul. 18, 2001

(65) Prior Publication Data
US 2002/0032249 A1 Mar. 14, 2002

Related U.S. Application Data

(63) Continuation-in-part of application No. 09/439,630, filed on Nov. 12, 1999, now abandoned.

(51) Int. Cl.[7] .................. C08G 77/08; B32B 27/00; C08J 3/28
(52) U.S. Cl. .............. 522/25; 522/26; 522/30; 522/148; 522/170; 528/12; 528/33; 428/352
(58) Field of Search ................. 522/148, 170, 522/25, 26, 30; 428/352; 528/12, 33

(56) References Cited

U.S. PATENT DOCUMENTS

| 4,250,053 A | 2/1981 | Smith |
| 4,279,717 A | 7/1981 | Eckberg et al. |
| 4,356,050 A | 10/1982 | Crivello et al. |
| 5,583,195 A | 12/1996 | Eckberg et al. |
| 5,650,453 A | 7/1997 | Eckberg et al. |
| 5,721,290 A | 2/1998 | Eckberg et al. |
| 5,798,400 A | * 8/1998 | Tokunaga et al. |

OTHER PUBLICATIONS

Beringer, et. al. J.Am.Chem Soc. 75,2708 (1953).
J. Med.Chem. 1974 17,507.

* cited by examiner

Primary Examiner—Susan W. Berman

(57) ABSTRACT

A radiation curable composition contains an epoxy-functional silicone polymer, an iodonium photocatalyst and a non-fluorescing polycyclic aromatic compound containing at least one hydroxy, alkoxy or glycidyl ether substituent bonded to an aromatic carbon atom of the compound.

20 Claims, No Drawings

RADIATION CURABLE SILICONE COMPOSITION

CROSS REFERENCE TO RELATED APPLICATIONS

This application is a Continuation-In-Part Application of U.S. Ser. No. 09/439,630, filed on Nov. 12, 1999, now abandoned.

FIELD OF THE INVENTION

The present invention relates to radiation curable silicone compositions, more particularly to radiation curable silicone compositions that exhibit very rapid cure speed.

BRIEF DESCRIPTION OF THE RELATED ART

Radiation curable systems that are based on iodonium salt catalyzed epoxy-functional silicone polymers and are useful for release coating applications are well known, see, for example, coassigned U.S. Pat. No. 4,279,717.

Increasing the speed at which such systems may be cured has been a topic of great interest. One approach has been to include cure speed enhancing additives, such as for example, photosensitizers, to such compositions. Iodonium cationic photocatalysts typically exhibit peak absorption at wavelengths less than 250 nanometers ("nm") and do not absorb or otherwise respond to radiation of wavelength greater than 300 nm. Thioxanthones which absorb light in the 300 to 400 nm range have been shown to be effective photosensitizers for iodonium photocatalysts in epoxysilicone-based formulations, see, for example, coassigned U.S. Pat. No. 5,650,453. Visible light photosensitizers for iodonium salt-catalyzed cationic curing systems are also known, see, for example, U.S. Pat. No. 4,250,053 and U.S. Pat. No. 4,356,050. However, the solubility of such materials in nonpolar epoxysilicone media is generally limited, so that their potential use for photocurable silicone applications is typically limited to very highly functionalized silicone polymers and monomers.

There remains a continuing interest in providing radiation curable silicone compositions that exhibit improved properties, such as for example, more rapid cure speed.

SUMMARY OF THE INVENTION

The present invention is directed to a radiation curable composition, comprising an epoxy-functional silicone polymer, a photocatalyst, and a cure speed-enhancing amount of a non-fluorescing polycyclic aromatic compound, said polycyclic aromatic compound comprising at least one hydroxyl, alkoxy or glycidyl ether substituent bonded to an aromatic carbon atom of the compound.

The composition of the present invention exhibits improved cure speed.

DETAILED DESCRIPTION OF THE INVENTION

In a preferred embodiment, the composition of the present invention comprises, based on 100 parts by weight ("pbw") of the composition, from 90 pbw to 99.9 pbw, more preferably from 95 pbw to 99.5 pbw, and still more preferably from 96 pbw to 99 pbw, of the epoxy-functional silicone polymer, from 0.05 pbw to 8 pbw, more preferably from 0.2 pbw to 5 pbw, and still more preferably from 0.5 pbw to 2 pbw, of the photocataylst and from 0.05 pbw to 2 pbw, more preferably from 0.1 pbw to 2 pbw, and still more preferably from 0.2 pbw to 1 pbw, of the non-fluorescing polycyclic aromatic compound.

Compounds suitable as the polycyclic aromatic compound of the composition of the present invention are those aromatic hydrocarbon compounds comprising two or more hydrocarbon rings, preferably at least two of which are fused rings, that is, rings joined such that each of the fused rings shares two or more carbon atoms with at least one other ring, which contain the maximum possible number of conjugated double bonds for number of carbon atoms contained in the rings and which contain at least one hydroxy, alkoxy or glycidyl ether substituent bonded to an aromatic carbon atom of the compound.

Polycyclic aromatic compounds suitable for use as the polycyclic aromatic compound of the present invention include, for example, hydroxypentalenes, hydroxyindenes, naphthols, dihydroxynaphthalenes, alkoxynaphthols, alkoxynaphthalenes, alkoxydihydoxynaphthalenes, glycidyl naphthalene ethers, hydroxyazulenes, alkoxyazulenes hydroxyphenanthrenes, alkoxyphenanthrenes, hydroxyanthracenes, alkoxyanthracenes, hydroxyanthrols and alkoxyanthrols.

In a preferred embodiment, the polycyclic aromatic compound comprises one or more compounds of the structural formula (I):

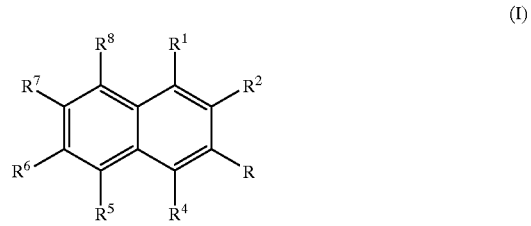

(I)

wherein $R^1$, $R^2$, $R^3$, $R^4$, $R^5$, $R^6$, $R^7$ and $R^8$ are each independently H, halo, hydroxy or a monovalent hydrocarbon radical, provided that at least one of $R^1$, $R^2$, $R^3$, $R^4$, $R^5$, $R^6$, $R^7$ and $R^8$ is hydroxy, alkoxy or a monovalent glycidyl ether radical.

As used herein, the terminology "monovalent hydrocarbon radical" includes monovalent acyclic hydrocarbon radicals, monovalent alicyclic hydrocarbon radicals and monovalent aromatic hydrocarbon radicals.

As used herein, the terminology "monovalent acyclic hydrocarbon radical" means a monovalent straight chain or branched hydrocarbon radical, preferably containing from 2 to 20 carbon atoms per radical, which may be saturated or unsaturated and which may be optionally substituted or interrupted with one or more functional groups, such as, for example, amino, carboxyl, cyano, hydroxy, halo, mercapto, and oxy. Suitable monovalent acyclic hydrocarbon radicals include, for example, alkyl such as, for example, methyl, ethyl, sec-butyl, tert-butyl, octyl, dodecyl or stearyl; alkoxy, such as, for example, methoxy or ethoxy; hydroxyalkyl, such as, for example, hydroxyethyl or hydroxypropyl; alkenyl, such as, for example, ethenyl or propenyl; alkynyl, such as, for example, propynyl or butynyl; cyanoalkyl, such as for example, cyanomethyl or cyanoethyl; carboxyalkyl, such as, for example, carboxymethyl or carboxypropyl; alkylamido such as, for example, methylamido or dodecylamido; and haloalkyl, such as, for example, chloromethyl, 2-fluoropropyl, 2,2-difluoropropyl or 3,3,3-trifluoropropyl, as well as monovalent glycidyl ether radicals. As used herein the terminology "monovalent glycidyl ether radical" means a monovalent radical containing at least one oxygen atom substituted with at least one glycidyl-containing moiety, such as, for example, glycidyloxy or glycidylalkyloxy, including, for example, glycidylethyloxy or glycidylpropyloxy.

As used herein, the terminology "monovalent alicyclic hydrocarbon radical" means a monovalent radical containing one or more saturated hydrocarbon rings, preferably containing from 4 to 10 carbon atoms per ring, per radical which may optionally be substituted on one or more of the rings with one or more functional groups, such as for example, alkyl, halo or alkylene groups, each preferably containing from 2 to 6 carbon atoms per group, and which, in the case of two or more rings, may be fused rings. Suitable monovalent alicyclic hydrocarbon radicals include, for example, cyclohexyl and cyclooctyl.

As used herein, the terminology "monovalent aromatic hydrocarbon radical" means a monovalent hydrocarbon radical containing at least one aromatic ring per radical, which may optionally be substituted on the aromatic ring with one or more functional groups, such as for example, alkyl, halo or alkylene groups, each preferably containing from 2 to 6 carbon atoms per group. In a preferred embodiment, the monovalent aromatic hydrocarbon radical is monocyclic, that is, contains only one aromatic ring per radical. Suitable monovalent aromatic hydrocarbon radicals include, for example, phenyl, tolyl, 2,4,6-trimethylpheny and 1,2-isopropylmethylphenyl.

In a preferred embodiment, at least two, more preferably, two, of $R^1$, $R^2$, $R^3$, $R^4$, $R^5$, $R^6$, $R^7$ and $R^8$ are each independently hydroxy, alkoxy or a monovalent glycidyl ether radical.

As used herein the notation "(Cx-Cy)", wherein x and y are each positive integers, in reference to an organic compound or substituent group means that the compound or substituent group may contain from x carbon atoms to y carbon atoms per compound or group.

In a preferred embodiment, $R^1$, $R^2$, $R^3$, $R^4$, $R^5$, $R^6$, $R^7$ and $R^8$ are each independently H, hydroxy, alkyl, preferably $(C_1-C_6)$alkyl, alkoxy, preferably $(C_1-C_6)$alkoxy, a monovalent glycidyl ether radical, preferably glycidyloxy, or alkylamido, preferably $(C_1-C_{18})$alkylamido, provided that at least one of $R^1$, $R^2$, $R^3$, $R^4$, $R^5$, $R^6$, $R^7$ and $R^8$ is hydroxy, alkoxy or a monovalent glycidyl ether radical.

In a highly preferred embodiment, one or more of $R^1$, $R^2$, $R^3$, $R^4$, $R^5$, $R^6$, $R^7$ and $R^8$ are each independently hydroxy, alkoxy, preferably $(C_1-C_6)$alkoxy, or a monovalent glycidyl ether radical, preferably glycidyloxy, and the remaining substituents are each independently H or $(C_1-C_6)$alkyl.

In a highly preferred embodiment, one or more of $R^1$, $R^2$, $R^3$, $R^4$, $R^5$, $R^6$, $R^7$ and $R^8$ are each hydroxy, at one or more of $R^1$, $R^2$, $R^3$, $R^4$, $R^5$, $R^6$, $R^7$ and $R^8$ are each independently alkoxy, preferably $(C_1-C_6)$alkoxy, and the remaining substituents are each independently H or alkyl, preferably $(C_1-C_6)$alkyl. Exemplary compounds include 4-methoxy-1-naphthtol, 7-methoxy-1-naphthol, dimethoxynaphthtols, 4-butoxy-1-naphthol and dibutoxynaphthols, with 1-naphthol compounds being preferred.

In a highly preferred embodiment, one or more of $R^1$, $R^2$, $R^3$, $R^4$, $R^5$, $R^6$, $R^7$ and $R^8$ are each independently hydroxy or alkoxy, preferably $(C_1-C_6)$alkoxy, another one or more of $R^1$, $R^2$, $R^3$, $R^4$, $R^5$, $R^6$, $R^7$ and $R^8$ are each independently alkylamido, preferably $(C_1-C_{18})$alkylamido, and the remaining substituents are each independently H or alkyl, preferably $(C_1-C_6)$alkyl. Exemplary compounds include N-dodecyl-1-hydroxy-2-naphthalene carboxamide and N-dodecyl-1-methoxy-2-naphthalene carboxamide.

In a highly preferred embodiment, two or more of $R^1$, $R^2$, $R^3$, $R^4$, $R^5$, $R^6$, $R^7$ and $R^8$ are each hydroxy and the remaining substituents are each independently H or alkyl, preferably $(C_1-C_6)$alkyl. Exemplary compound include 1,4-dihydroxynaphthalene, 1,5-dihydroxynaphthalene, 2,3-dihydroxynaphthalene, 2,7-dihydroxynaphthalene and trihydroxynaphthalenes.

In a highly preferred embodiment, one or more of $R^1$, $R^2$, $R^3$, $R^4$, $R^5$, $R^6$, $R^7$ and $R^8$ are each independently alkoxy, preferably $(C_1-C_6)$alkoxy, and the remaining substituents are each independently H or alkyl, preferably $(C_1-C_6)$alkyl. Exemplary compounds include 1-methoxynaphthalene, dimethoxynaphthalenes, 1-butoxynaphthalene and dibutoxynaphthalenes.

In a highly preferred embodiment, one or more of $R^1$, $R^2$, $R^3$, $R^4$, $R^5$, $R^6$, $R^7$ and $R^8$ are each independently a monovalent glycidyl ether radical, preferably glycidyloxy, and the remaining substituents are each independently H or alkyl, preferably $(C_1-C_6)$alkyl. Exemplary compounds include 1-naphthyl glycidyl ether, 1,4-diglycidyl naphthalene ether, 1,5-diglycidyl naphthalene ether, 1,6-diglycidyl naphthalene ether and 2,7-diglycidyl naphthalene ether.

Epoxy-functional silicone polymers suitable as the epoxy-functional silicone polymer of the present invention are known in the art, see, for example, U.S. Pat. No. 4,279,717, and include, for example, polydimethylsiloxanes having pendant epoxy functional substituent groups, such as, for example, —$(CH_2)_3$—O—$CH_2$—$CHCH_2O$ or 2-ethyl-(3,4-epoxycyclohexyl), that is, —$(CH_2)C_6H_9O$.

In a first preferred embodiment, the epoxy-functional silicone polymer comprise one or more polymers or copolymers according to the structural formula (II)

$$M^E D^E_a D_b M^E \qquad (II)$$

wherein:
  $M^E$ is $R^9_2 R^{10} SiO_{1/2}$;
  D is and $R^{11}_2 SiO$;
  $D^E$ is $R^{12} R^{13} SiO$; each $R^9$, $R^{11}$ and $R^{12}$ is independently a monovalent hydrocarbon radical; each $R^{10}$ and $R^{13}$ is independently alkylene epoxycycloalkyl or glycidoxyalkyl; and a and b are each independently integers from 10 to 250.

In a preferred embodiment, each $R^9$, $R^{11}$ and $R^{12}$ is independently alkyl, aryl, haloalkyl or hydroxyalkyl, more preferably $(C_1-C_6)$alkyl, aryl, halo$(C_1-C_6)$alkyl or hydroxy$(C_1-C_6)$alkyl.

In a preferred embodiment, $R^{10}$ and $R^{13}$ are each independently 2-ethyl-(3,4-epoxycyclohexyl) or —$(CH_2)_3$—O—$CH_2$—$CHCH_2O$.

In second preferred embodiment, the epoxy-functional silicone polymer comprises one or more polymers or copolymers according to the structural formula (III):

$$MD^E_c D_d M \qquad (III)$$

wherein:
  M is $R^{14}_3 SiO_{1/2}$;
  each $R^{14}$ is independently a monovalent hydrocarbon radical,
  D and $D^E$ are each defined as above, and
  c and d are each independently integers from 50 to 500.

In a preferred embodiment, each $R^{14}$ is independently alkyl, aryl, haloalkyl or hydroxyalkyl, more preferably $(C_1-C_6)$alkyl, aryl, halo$(C_1-C_6)$alkyl or hydroxy$(C_1-C_6)$alkyl.

In a preferred embodiment, $R^{14}$ is 2-ethyl-(3,4-epoxycyclohexyl) or —$(CH_2)_3$—O—$CH_2$—$CHCH_2O$.

Certain modified epoxy functional silicones have been found to allow the use of a wider range of photoinitiators and additives, that is, photoinitiators and additives that are immiscible with or only sparingly soluble in the epoxy functional silicones of structural formulas (II) and (III).

In a third preferred embodiment, the epoxy functional silicone comprises an oxo acid modified epoxy functional silicone made by reaction of an epoxy functional silicone according to formula (II) or (III) above with less than its molar equivalent, based on epoxy functionality, of one or more polyether carboxylic acids. Suitable oxo acid modified epoxy functional silicones include those made by reaction of an epoxy functional silicone with a polyether acid according to the structural formula (IV):

$$HOOC(((CH_2)_eO)_f((CH_2)_gO)_h)R^{15} \qquad (IV)$$

wherein:

R$^{15}$ is H or a monovalent hydrocarbon, e, f, g and h are each integers $\geq 0$, provided that, at least, e and f or g and h are each greater than 0.

In a preferred embodiment, R$^{15}$ is H, alkyl, alkenyl, alkynyl aryl, alkaryl or carboxylate such as, for example, 3,6-dioxoheptanoic acid or 3,6,9-trioxodecanoic, as described in coassigned U.S. Pat. No. 5,721,290.

In a fourth preferred embodiment, the epoxy functional silicone comprises a non-fluorescing polycyclic aromatic-modified epoxysilicone polymer or copolymer made by reaction of an epoxy functional silicone polymer or copolymer according to formula (II) or (III) with less than its molar equivalent, based on epoxy functionality, of a compound selected from the group consisting of R$^{16}$COOH, (R$^{16}$CO)$_2$O, R$^{16}$COX, R$^{16}$SO$_3$H or R$^{16}$SO$_2$X, wherein R$^{16}$ is a monovalent polycyclic aromatic hydrocarbon radical and X is halo. As used herein, the terminology "monovalent polycyclic aromatic hydrocarbon radical" means a monovalent hydrocarbon radical containing two or more fused aromatic rings per radical, which may optionally be substituted on the aromatic ring with one or more alkyl, halo or alkylene groups, each preferably containing from 2 to 6 carbon atoms per group, or other functional groups. Suitable monovalent polycylic aromatic hydrocarbon radicals include, for example, naphthyl and anthryl. Suitable compounds include, for example, naphthoic acid, 1-naphthyl acetic acid, (1-naphthoxy)acetic acid, 4-hydroxy-2-naphthylacetic acid, naphthyl-1-sulfonic acid and anthracene-9-carboxylic acid. Similar compounds and their syntheses are described in coassigned U.S. Pat. No. 5,583,195.

Suitable onium photocatalysts, such as for example, triphenylsulfonium salts, diphenyl iodonium salts, azonium salts, are generically known. Iodonium salts such as, for example, bis(4-alkylphenyl)iodonium hexafluroantimonates, or bis(4-alkylphenyl)iodonium hexaflurophosphates, are preferred due to their low toxicity and compatibility with non-polar materials.

In a preferred embodiment, the photocatalyst comprises an iodonium salt that is compatible with the other components of the radiation curable epoxysilicone composition, such as, for example, the salts disclosed in U.S. Pat. No. 4,279,717. In a more highly preferred embodiment, the photocatalyst component of the radiation curable epoxysilicone composition of the present invention comprises one or more of the alkylphenyl iodonium salts of PF$_6^-$, SbF$_6^-$ or B(C$_6$F$_5$)$_4^-$. In a highly preferred embodiment, the photocatalyst is selected from one or more of mixed bis(4-(C$_8$–C$_{14}$)alkylphenyl)iodonium hexafluoroantimonates, mixed bis(4-(C$_8$–C$_{14}$)alkylphenyl)iodonium hexafluorophosphates and (4-octyloxyphenyl)(phenyl)iodonium hexafluoroantimonate.

In a preferred embodiment, the composition of the present invention comprises an oxo acid-modified epoxysilicone polymer or copolymer, an (alkylphenyl)iodonium hexafluorophosphate photoinitiator and a cure speed enhancing amount of a polycylclic aromatic compound.

In a preferred embodiment, the composition of the present invention comprises an polycyclic aromatic-modified epoxysilicone polymer or copolymer, (4-octyloxyphenyl)(phenyl)iodonium hexafluoroantimonate and a cure speed enhancing amount of a polycylclic aromatic compound.

The radiation curable composition of the present invention may optionally include other components known in the art such as, for example, reactive or non-reactive diluents, such as, for example, aliphatic alcohols such as, for example, diacetone alcohol, oxiranyl compounds such as, for example, alkylgycidyl ethers and alkenyl compounds such as, for example, vinyl ethers; and photosensitizers, such as, for example, thioxanthones, including for example, 2-chloro-4-propoxythioxanthone and 2-isopropylthioxanthone.

A layer of the radiation curable composition of the present invention is applied to the substrate by, for example, spray coating, roll coating, rod coating or extrusion and then exposed to actinic radiation, preferably ultraviolet ("UV") radiation, to cure the coating layer. Suitable substrates include for example, paper, such as, for example, supercalendered kraft paper, glassine paper, machine finished paper and machine glazed paper, polymer films, such as, for example, polyolefin films, polyester films and polystyrenic films, and metal foils, such as, for example, aluminum foil, as well as composite substrates made by combining any of the above listed substrates, such as, for example, polyolefin-coated kraft paper.

The coated substrate made by the method of the present invention is useful a release liner for pressure sensitive adhesive-backed articles such as, for example, adhesive labels and adhesives tapes.

An adhesive laminate comprises a release-coated substrate, said release-coated substrate comprising a first substrate and a cured layer of the composition of the present invention disposed on at least a portion of at least one surface of the first substrate, laminated with a pressure sensitive adhesive-coated substrate, said pressure sensitive adhesive-coated substrate comprising a layer of a pressure sensitive adhesive disposed on at least a portion of at least one surface of a second substrate, such that the cured coating layer of the release-coated substrate is in contact with the pressure sensitive adhesive layer on the pressure sensitive adhesive-coated substrate. Suitable pressure sensitive adhesive compositions, such as, for example, emulsion acrylic adhesives, solvent acrylic adhesives, hot melt adhesives, emulsion rubber adhesive, solvent rubber adhesives, and methods for making pressure sensitive adhesive coated substrates are well known in the art.

The pressure sensitive adhesive coated substrate may be easily removed from the coated substrate made by the method of the present invention and applied to another substrate, as desired.

EXAMPLES 1–9

A 30% solution of mixed bis(4-alkylphenyl)iodonium hexafluoroantimonates ("ISbF$_6$"), prepared as described by Beringer et al., J.Am.Chem. Soc. 75, 2708 (1953) wherein the alkyl portions of the alkylphenyl moieties comprise a distribution of straight and branched (C$_8$–C$_{14}$)hydrocarbon chains derived from "linear alkylate" grade dodecylbenzene in diacetone alcohol was used as the basis for several different catalyst solutions, each including a different combination of an aromatic additive (phenol or methoxynaphthol ("MN")), and a thioxanthone additive (2-chloro-4-propoxythioxanthone ("CPTX") or 2-isopropylthioxanthone ("IPTX")), in the relative amounts (expressed as mole %, based on the moles of iodonium salt present) set forth below in TABLE I. All catalyst solutions were prepared by simple mixing of warm components and each of such mixtures was clear and stable, with no evidence of any precipitation after storage at room temperature for several days.

The coating compositions of Examples 1–9 were each made by blending 2 pbw of a respective one of the catalyst solutions with 100 pbw of an epoxy-functional polysiloxane ($M^E D_4^E D_{85} M^E$, wherein $M^E$, $D^E$, D and $M^E$ are each defined as above, $R^9$, $R^{10}$, $R^{12}$ and $R^{14}$ are each methyl and $R^{11}$ and $R^{13}$ are each 2-ethyl-(3,4-epoxycyclohexyl)). Each of the resulting compositions was then manually applied to polykraft substrate using a Gardner Applicator to a coat weight of ~1.2 grams per square meter ($g/m^2$). The coated sheets were then exposed to focused UV light from 2 Hanovia medium pressure mercury vapor lamps mounted in an RPC model 1202 QC Lab Processor. The minimum total lamp power at a conveyer line speed of 400 feet per minute ("fpm") at which the coated silicone would cure to smear- and migration-free adhesive coatings was ascertained. The extent of cure was qualitatively assessed by a tape migration test and rubbing the surface of the cured siloxane coating layer with a fingertip. The tape migration test was conducted by firmly pressing the adhesive side of a piece of 3M Scotch™ 610 tape to the surface of the cured siloxane coating, peeling the tape off and then making a loop of the tape such that the adhesive side of the tape was brought into contact with itself. Migration of uncured siloxane coating to the adhesive side of the tape would interfere with the ability of the tape to stick to itself. The surface of the cured coating layer was then rubbed vigorously with a fingertip and then the surface was visually examined for evidence of smearing. Migration of siloxane coating to the tape and smearing of the siloxane coating layer were each taken as being indicative of an incompletely cured coating layer.

The aromatic additive and thioxanthone additive used in the catalyst solution and the lamp power results are set forth in TABLE I below for each of the compositions of Examples 1–9.

TABLE I

| Example # | Additive[1] | Thioxanthone Additive[1] | Minimum Lamp Power[2] (watts/inch) at Conveyor Speed of 400 fpm |
|---|---|---|---|
| 1 | — | — | 400 |
| 2 | 3.6% MN | — | 200 |
| 3 | 3.6% phenol | — | 400 |
| 4 | — | 0.9% CPTX | 300 |
| 5 | — | 0.9% IPTX | 300 |
| 6 | 3.6% phenol | 0.9%CPTX | 300 |
| 7 | 3.6% phenol | 0.9% IPTX | 300 |
| 8 | 3.6% MN | 0.9% CPTX | 200 |
| 9 | 3.6% MN | 0.9%IPTX | 200 |

[1]expressed as mole % in catalyst solution, based on the moles of iodonium salt present
[2]for coating composition consisting of 100 pbw epoxy-functional polysiloxane and 2 pbw catalyst solution The results indicate that phenol has no apparent effect on UV cure of this system, that 4-methoxynaphthol, either alone or in combination with thioxanthones, is superior to phenol as an additive for promotion of rapid photocure in this epoxysilicone based system and that 4-methoxynaphthol is also superior to CPTX and IPTX as a stand-alone cure accelerator. The clear appearance of the respective MN-containing compositions indicated that MN is also nicely soluble in the nonpolar silicone medium, which aids its efficacy.

EXAMPLES 10–14

Several catalyst solutions, each based on bis(alkylphenyl) iodonium hexafluorophosphate ("$IPF_6$") were made, each including a different combination of various additives, that is, N-dodecyl-1-hydroxy-2-naphthalenecarboxamide ("DDHNA"), CPTX and/or IPTX, in the relative amounts set forth in TABLE II below. The coating compositions of Examples 10–14 were each made by blending 4 pbw of a respective one of the catalyst solutions with 100 pbw of an oxa-acid modified epoxy siloxane which was prepared by reaction of 100 pbw of the $M^E D_4^E D_{85} M^E$ epoxysilicone polymer described above with 2 pbw of 3,6,9-trioxodecanoic acid, as described in U.S. Pat. No. 5,271,290. All blends of the catalyst solutions and oxo-acid modified epoxy silicone polymer were clear, stable solutions.

The comparative cure determinations for compositions of Examples 10–14 were conducted on hand-drawn 0.5 mil thick samples on polykraft substrate, using a Fusion Systems Lab UV Processor which included a single 125 watt/inch microwave fired 'H' bulb mounted above a conveyer as the radiation source. Conveyer speed was manipulated until the maximum speed at which smear- and migration- free adhesive coatings were obtained was determined, with lamp power held constant. The components of the catalyst solution and the line speed results are set forth in TABLE II below for the compositions of Examples 10–14.

TABLE II

| Ex # | $IPF_6$[1] | IPTX[1] | CPTX[1] | DDHNA[1] | DAA[1] | Line Speed[2] (fpm) |
|---|---|---|---|---|---|---|
| 10 | 45 | 10 | — | — | 45 | 20 |
| 11 | 45 | — | 10 | — | 45 | 24 |
| 12 | 40 | 10 | — | 10 | 40 | 28 |
| 13 | 40 | — | 10 | 10 | 40 | 32 |
| 14 | 50 | — | — | — | 50 | 10 |

[1]expressed as wt % in catalyst solution, based on the moles of iodonium salt present
[2]for coating composition consisting of 100 pbw of an oxo-acid modified epoxy silicone and 4 pbw catalyst solution The results indicate that DDHNA is an effective additive which promotes cure of the $IPF_6$ system in the oxo-acid modified epoxysilicone polymer.

EXAMPLES 15–16

DDHNA was then treated with dimethoxysulfoxide to convert the OH group of DDHNA to a methoxy group, according the reaction (I):

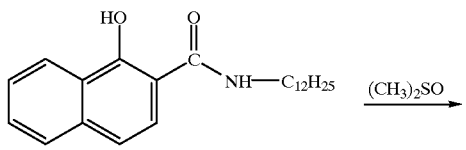

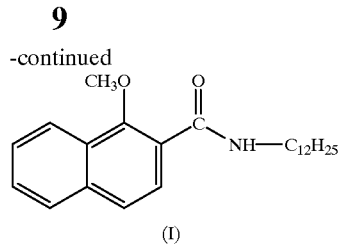

(I)

The product, N-dodecyl-1-methoxy-2-naphthalenecarboxamide (DDMNA) was soluble in the oxa-acid modified epoxy silicone polymer 475-10-1633.

Two IPF$_6$-based catalyst solutions, each including 45 wt % IPF$_6$, 45 wt % DAA and 10 wt % of either DDHMA or DDMNA, were made. The coating compositions of Examples 15 and 16 were each made by blending 4 pbw of a respective one of the catalyst solutions with the oxo-acid modified epoxy silicone polymer described above. The cure speed of the coating compositions of Examples 15 and 16 was determined according to the procedure described in Examples 10–14 above. The naphthol component of each of the catalyst packages and maximum conveyer speed results are set forth below in TABLE III for the coating compositions of Examples 15 and 16.

TABLE III

| Ex # | Additive | Conveyor Speed[2] (fpm) |
|------|----------|-------------------------|
| 15 | DDHNA | 25 |
| 16 | DDMNA | 10 |

EXAMPLES 17–24

Catalyst solutions consisting of 50% IPF$_6$, 10% naphthol additive and 40% DAA diluent were prepared. The coating compositions of Examples 17 to 24 were each made by blending 4 pbw of a respective one of the catalyst solutions with 100 pbw of the oxo-acid modified epoxy silicone polymer described above in Examples 10–14. The maximum conveyer speed for curing of each of the compositions of Examples 17 to 24 was determined according to the procedure described in Examples 10–14 above. The naphthol compound used in the catalyst solution and the conveyor speed results are set forth below in TABLE IV for Examples 17–24.

TABLE IV

| Ex # | Additive | Conveyor Speed (fpm) |
|------|----------|----------------------|
| 17 | 1,4-dihydroxynaphthalene | 32 |
| 18 | 2,3-dihydroxynaphthalene | 20 |
| 19 | 2,6-dihydroxynaphthalene | 25 |
| 20 | 1,5-dihydroxynaphthalene | 32 |
| 21 | 1,6-dihydroxynaphthalene | 30 |
| 22 | 2,7-dihydroxynaphthalene | 25 |
| 23 | 4-methoxy-1-naphthol | 25 |
| 24 | 7-methoxy-2-naphthol | 15 |

The results indicate that each of the naphthol compounds used in Examples 17–24 sensitizes the IPF$_6$ catalyst in the oxo-acid modified epoxysilicone system and that 1-naphthols are superior to 2-naphthols as iodonium photo-sensitizers.

EXAMPLES 25–28

Several more candidate IPF$_6$-based catalyst solutions, each containing 40 wt % IPF6, 40 wt % DAA, 10 wt % of a 1-naphthol compound and 10 wt % of a thioxanthone compound, were prepared. The coating compositions of Examples 25–28 were made by blending 4 pbw of a respective one of the catalyst solutions with 100 pbw of the oxo-acid modified epoxysilicone polymer described above in Examples 10–14. The maximum conveyer speed for cure of the coating compositions was determined according to the procedure set forth above in Examples 10–14. The naphthol and thioxanthone compounds used in the catalyst composition and the conveyor speed results are set forth in TABLE V below for the compositions of Examples 25–28.

TABLE V

| Ex # | 1-Naphthol Compound | Thioxanthone Compound | Conveyor speed (fpm) |
|------|---------------------|-----------------------|----------------------|
| 25 | 1,4-dihydroxynaphthalene | CPTX | 45 |
| 26 | 1,4-dihydroxynaphthalene | IPTX | 40 |
| 27 | 1,5-dihydroxynaphthalene | IPTX | 42 |
| 28 | 4-methoxy-1-naphthol | CPTX | 42 |

The results indicate an apparent synergistic effect when thioxanthones are combined with 1-naphthols and IPF$_6$.

EXAMPLES 29–31

Several catalyst solutions, each containing 40 wt % ISbF$_6$, 40% of a (C$_{12}$–C$_{14}$)alkylglycidyl ether reactive diluent (DY-025, Ciba Geigy) 10 wt % of a naphthol compound and 10 wt % of a thioxanthone compound, were made. The coating compositions of Examples 29–31 were each made by blending 2 pbw of a respective one of the catalyst solutions with 100 pbw of the M$^E$D$_4^E$D$_{85}$M$^E$ epoxy silicone polymer described above. The maximum conveyer speed for photo-cure of each of the compositions was determined according to the procedure described above in Examples 10–14. The naphthol and thioxanthone compounds used in the catalyst solution and the conveyor speed results are set forth in TABLE VI below for the compositions of Examples 29–31.

TABLE VI

| Ex # | Naphthol Compound | Thioxanthone Compound | Conveyor speed (fpm) |
|------|-------------------|-----------------------|----------------------|
| 29 | 4-methoxy-1-naphthol | CPTX | 90 |
| 30 | 1-methoxynaphthalene | CPTX | 75 |
| 31 | 1-methoxynaphthalene | IPTX | 48 |

The results indicate that each of the compositions of Examples 29–31 exhibited very rapid cure, with the composition of Example 29 exhibiting extremely rapid cure.

EXAMPLES 32–34

Several catalyst solutions, each containing ISbF$_6$, a naphthol compound and DAA in the relative amounts set forth below in TABLE VII, were prepared. The coating compositions of Examples 32–34 were each made by blending 2 pbw of a respective one of the catalyst solutions with 100 pbw of the M$^E$D$_4^E$D$_{85}$M$^E$ epoxy silicone polymer described above. The maximum conveyer speed for each composition was determined according to the procedure described above in Examples 10–14. The amount of ISbF$_6$, naphthol compound and diluent used in the catalyst solutions and the conveyor speed results are set forth in TABLE VII below for the compositions of Examples 32–34.

TABLE VII

| Ex # | ISbF$_6$[1] | Naphthol Compound[1] | DAA[1] | Conveyor Speed[2] (fpm) |
|---|---|---|---|---|
| 32 | 45 | 5% 1,5-dihydroxynaphthalene | 50 | 52 |
| 33 | 45 | 5% 4-methoxy-1-naphthol | 50 | 52 |
| 34 | 50 | — | 50 | 30 |

[1]wt % in catalyst solution, based on the moles of iodonium salt present
[2]for coating composition consisting 100 pbw of an epoxy silicone polymer and 2 pbw catalyst solution The results indicate that presence of the naphthol compounds enhanced cure speed, even in the absence of a thioxanthone synergist.

EXAMPLES 35–38 AND COMPARATIVE EXAMPLE C1

While DHN was shown to be an excellent sensitizing agent for iodonium catalyzed photocure of epoxysilicones, we also found it to be less soluble than desired, both in onium catalyst packages and in epoxysilicone media. Accordingly, two derivatives of DHN were prepared to see if superior miscibility could be achieved without loss of photocure enhancement.

1,5-dibutoxynaphthalene (DBN) and 5-butoxy-1-naphthol (BOHN) were prepared via published methods by base-assisted reaction of n-iodobutane with DHN. Proton NMR confirmed that the desired products were obtained.

Several catalyst solutions, each containing 45 wt % ISbF$_6$, 50 wt % diluent (alkyl glycidyl ether (DY-025)) and 5 wt % naphthalene additive were prepared. The coating compositions of Examples 35–38 were each made by blending 2 pbw of a respective one of the catalyst solutions with 100 pbw the M$^E$D$_4^E$D$_{85}$M$^E$ epoxy silicone polymer described above. The composition of Comparative Example 1 was made by combining 2 pbw of a catalyst solution containing 50 wt % ISbF$_6$ and 50 wt % DY-025 diluent with 100 pbw of the M$^E$D$_4^E$D$_{85}$M$^E$ epoxy silicone polymer described above. The maximum conveyer speed for each composition was determined according to the procedure described above in Examples 10–14. The naphthol compound used in the catalyst solutions and the conveyor speed results are set forth in TABLE VIII below for the compositions of Examples 35–38 and for Comparative Example C1.

TABLE VIII

| Ex # | Naphthol Additive | Conveyor Speed (fpm) |
|---|---|---|
| 35 | MN | 32 |
| 36 | DHN[1] | 30 |
| 37 | DBN | 28 |
| 38 | BOHN | 28 |
| C1 | — | 20 |

[1]DHN was incompletely soluble in the iodonium salt/DY-025 mixture, so the actual wt % of DHN present in catalyst solution used in Example 36 was less than 5 wt %

The results indicate that substitution of OH with butoxy in 1,5-DHN improves miscibility with only a minor loss of photocure assist.

EXAMPLES 39–42 AND COMPARATIVE EXAMPLES C2 and C3

Several catalyst solutions, each containing 47.5 wt % ISbF$_6$, 5 wt % naphthalene additive, and 47.5 wt % DAA were prepared. The coating compositions of Examples 39-42 were each made by blending 2 pbw of a respective one of the catalyst solutions with 100 pbw of the M$^E$D$_4^E$D$_{85}$M$^E$ epoxy silicone polymer described above. Comparative Example C2 was made by blending 2 pbw of a catalyst solution containing 50 wt % ISbF$_6$ and 50 wt % DAA with a with 100 pbw of the M$^E$D$_4^E$D$_{85}$M$^E$ epoxy silicone polymer described above. Comparative Example C3 was made by blending 2 pbw of a catalyst solution containing 50 wt % ISbF$_6$ and 50 wt % diluent (DY-025) with a with 100 pbw of the M$^E$D$_4^E$D$_{85}$M$^E$ epoxy silicone polymer described above. The maximum conveyer speed for each composition was determined according to the procedure described above in Examples 10–14. The naphthol compound used in the catalyst solutions and the conveyor speed results are set forth in TABLE IX below for the compositions of Examples 39–42 and for Comparative Examples C2 and C3.

TABLE IX

| Ex # | Naphthol Additive | Conveyor Speed (fpm) |
|---|---|---|
| 39 | DHN | 52 |
| 40 | MN | 52 |
| 41 | BOHN | 45 |
| 42 | DBN | 30 |
| C2 | — | 30 |
| C3 | — | 20 |

The results indicate that acceleration of iodonium-catalyzed photocure of the epoxysilicone polymer is most pronounced for naphthalenes bearing at least one OH in the 1-position. Alcohols are known to speed cationic cure of epoxy systems, which probably accounts for the faster cure of the DAA-containing composition of Example 39 versus the DY-025 diluent containing composition of Example 36 above. It should be noted that DHN is quite soluble in iodonium/DAA mixtures.

EXAMPLES 43–46 AND COMPARATIVE EXAMPLE C4

Catalyst solutions, each containing 48 wt % ISbF$_6$, 2 wt % naphthalene additive and 2 wt % thioxanthone additive and 48 wt % DAA were prepared. The coating compositions of Examples 43–46 were each made by blending 2 pbw of a respective one of the catalyst solutions with 100 pbw of the M$^E$D$_4^E$D$_{85}$M$^E$ epoxy silicone polymer described above. Comparative Example C4 was made by blending 2 pbw of a catalyst solution containing 50 wt % ISbF$_6$ and 50 wt % DAA with a with 100 pbw of the M$^E$D$_4^E$D$_{85}$M$^E$ epoxy silicone polymer described above. The maximum conveyer speed for each composition was determined according to the procedure described above in Examples 10–14. The naphthol and thioxanthone compounds used in the catalyst solutions and the conveyor speed results are set forth in TABLE VIII below for the compositions of Examples 43–46 and for Comparative Example C4.

TABLE X

| Ex # | Naphthalene Additive | Thioxanthane Additive | Conveyor Speed (fpm) |
|---|---|---|---|
| 43 | DHN | ITX | 55 |
| 44 | DHN | CPTX | 55 |
| 45 | MN | ITX | 55 |
| 46 | MN | CPTX | 60 |
| C4 | — | — | 30 |

Small, but significant thioxanthone synergism with DHN as well as MN was observed in these qualitative photocure runs.

EXAMPLES 47–49

Catalyst solutions, each containing 30 wt % (4-octyloxyphenyl)(phenyl)iodonium hexafluoroantimonate ("OPPI"), 7 wt % DHN, 7 wt % ITX and 56 wt % of a diluent or mixture of diluents (DY-025, DAA or a mixture of DY-025 and n-butylester of hydroxyacetic acid (BEHAA)), were prepared.

It was observed that about half of the DHN weighed into the composition of Example 47 did not dissolve in the 1/1 mix of BEHAA/DY-025. The catalyst packages used in Examples 47 and 48 contained equimolar amounts of OPPI and DHN, and about 60 mole % ITX (vs. OPPI).

In order to differentiate performance of these OPPI-containing catalyst packages, 100 parts of a naphthyl-modified epoxysilicone polymer were mixed with 0.5 wt % of each experimental catalyst package. This meant that 1500 ppm OPPI were present in the blends with the compositions of Examples 47 and 48, and 2500 ppm OPPI present in the blend with the composition of Example 49.

The naphthyl-modified epoxysilicone polymer was prepared as follows. 1250 grams of an epoxy-functional linear polydimethylsiloxane with an Epoxy Equivalent Weight of 1250 (1 mole oxirane) was dispersed in 900 grams of alkane solvent (Isopar® L, mixed alkanes with a boiling range of from about 130° C. to about 150° C.) plus 100 grams methyl ethyl ketone with 25 grams naphthylacetic acid (0.13 mole) and 20 grams triethanol amine. The reaction mixture was refluxed at 125° C. for 20 hours, and the resultant clear solution stripped of amine and solvent under vacuum at 165° C. A clear fluid product having a viscosity of 488 centiStokes was obtained.

Cure was qualitatively assessed as described in Examples 1–9 above and the total lamp power and conveyer speed were manipulated until the combination of minimum lamp power and maximum conveyer speed where smear- and migration-free cure of ~1.2 g/m² manually applied coat weight of catalyzed baths on polykraft paper was observed. The isothermal 30° C. DPC conversion of the catalyzed samples were compared using the Perkin-Elmer DSC7 calorimeter equipped with a 200 watt Osram mercury-xenon lamp photoaccessory. Results are set forth below in TABLE XI, conveyor speed in feet per minute (fpm), lamp power in Watts per inch ("W/in"), the time of light exposure to generation of peak exotherm, expressed in minutes ("$t_{peak}$" (min)) and the heat of reaction ("ΔH"), expressed as Joules per gram ("J/g").

TABLE XI

| Ex # | Diluent | Conveyor Speed (fpm) | Lamp Power, (W/in) | $t_{peak}$, (min) | ΔH, (J/g) |
|---|---|---|---|---|---|
| 47 | 28 wt % BEHAA 28 wt % DY-025 | 400 | 200 | 0.503 | 44.05 |
| 48 | 56 wt % DAA | 500 | 100 | 0.603 | 45.05 |
| 49 | 50% DY-025 | 400 | 200 | 0.837 | 23.18 |

These are all very fast cure responses, and are remarkable given the low concentration of active OPPI in the catalyzed mixtures.

EXAMPLES 50–53 AND COMPARATIVE EXAMPLE C5

Each of the compositions of Examples 50–53 were made by adding 2 pbw of a catalyst solution containing 30 wt % OPPI and 5.7 wt % DHN, with the remainder being ITX co-sensitizer and BEHAA or DAA reactive diluent, to 100 pbw of the naphthyl-modified epoxy silicone polymer described above in Examples 47–49.

As noted previously, DHN is not completely miscible in the iodonium solution in 1/1 BEHAA/DY-025, so the actual DHN concentration in the composition of Example 50 was probably about ½ of charged amount. 5.7% DHN concentration is equimolar to iodonium concentration in these packages, while 5.7% ITX is about 60 mole % of iodonium concentration. Qualitative cure assessment of catalyzed baths were carried out using the RPC Processor and Perkin Elmer DPC, as previously described. Results are set forth below in TABLE XII.

TABLE XII

| EX # | Thioxanthone additive | Diluent | Conveyor Speed, (fpm) | Lamp Power, (Watt/in) | $t_{peak}$, (min) | ΔH (J/g) |
|---|---|---|---|---|---|---|
| 50 | 5.7 wt % ITX | 27.8 wt % BEHAA/ 27.8 wt % DY-025 | 400 | 100 | 0.437 | 30.1 |
| 51 | 5.7 wt % ITX | 55.6 DAA | 400 | 100 | 0.457 | 60.6 |
| 52 | 5.7 wt % ITX | 56.6 BEHAA | 400 | 100 | — | 59.2 |
| 53 | — | 63.3 BEHAA | 400 | 100 | 0.587 | 58.8 |
| C5 | — | | 400 | 300 | 2.77 | 30.1 |

While all of these results are qualitative in nature, the conclusions we draw are unambiguous; those iodonium—catalyzed epoxysilicone coating compositions in which 1,5-dihydroxynaphthalene (and some of its derivatives) is miscible will cure much faster and more completely in the presence of DHN than in its absence. DHN therefore appears to be as useful as methoxynaphthol (MN) for speeding photocure of epoxysilicone coatings, despite its more limited solubility in these nonpolar coatings.

EXAMPLES 54–63 AND COMPARATIVE EXAMPLES C6–C8

Several photocatalyst packages were tested to assess the sensitizing effect of 1-naphthyl glycidyl ether (NAGE), using the Fusion systems™ 125 H lamp conveyer system. Maximum line speed where a 0.5 mil thick layer consisting of 2 parts of an ISbF6-based photocatalyst package plus 100 parts of the $M^E D_4^E D_{85} M^E$ epoxy silicone polymer described above coated on the polykraft substrate, crosslinked to a smear- and migration-free surface was determined. The NAGE-packages and controls were as follows:

TABLE XIII

| Ex # | ISbF$_6$ (wt %) | Naphthol Additive (wt %) | Ether Additive (wt %) | Thio-xanthane additive (wt %) | Diluent (wt %) | Conveyor Speed (fpm) |
|---|---|---|---|---|---|---|
| C6 | 50% | — | — | — | 50% DAA | 30 |
| C7 | 50% | — | — | — | 50% DY-025 | 20 |
| 54 | 40% | — | 4% NAGE | 4% ITX | 52% DY-025 | 40 |
| 55 | 40% | 4% MeON | — | 4% ITX | 52% DY-025 | 30 |
| 56 | 36% | — | 10% NAGE | 10% ITX | 44% DY-025 | 65 |
| 57 | 36% | 10% MeON | — | 10% ITX | 44% DY-025 | 50 |

TABLE XIII-continued

| Ex # | ISbF$_6$ (wt %) | Naphthol Additive (wt %) | Ether Additive (wt %) | Thio-xanthane additive (wt %) | Diluent (wt %) | Conveyor Speed (fpm) |
|---|---|---|---|---|---|---|
| 58 | 36% | — | 10% NAGE | 10% CPTX | 44% DY-025 | 62 |

Based on the results set forth in TABLE XIII, NAGE is an effective sensitizer for iodonium-photocatalyzed crosslinking of epoxysilicones, particularly in concert with thioxanthone co-sensitizers. Unlike DHN, NAGE is nicely soluble in DY-025 diluent.

The photocure of catalyzed baths consisting of 2 parts of these packages mixed with 100 parts of the $M^E D_4{}^E D_{85} M^E$ epoxysilicone polymer was qualitatively assessed according to the procedure described above in Examples 47–49, using a conveyor speed of 400 feet per minute. Results, including DPC analyses carried out using the Perkin Elmer DSC7, are set forth below in TABLE XIV.

TABLE XIV

| Ex # | Glycidyl Ether Additive | Thioxanthone Additive (wt %) | Diluent (wt %) | Lamp Power (W/in) | DPC t$_{peak}$ (min) | ΔH (J/g) |
|---|---|---|---|---|---|---|
| 60 | 3.5 NAGE | — | 66.5% DY-025 | 306 | 3.603 | 39.3 |
| 61 | 6.7 NAGE | — | 63.3% DY-025 | 300 | 2.320 | 46.9 |
| 62 | 3.5 NAGE | 4.6% ITX | 61.9% DY-025 | 300 | 0.753 | 46.0 |
| 63 | 6.7 NAGE | 4.6% ITX | 59.7% DY-025 | 100 | 0.603 | 45.2 |
| C8 | — | — | 70% DY-025 | 500 | 5.070 | 10.8 |

The results in TABLE XIV indicate that naphthyl glycidyl ether is a sensitizer for ISbF$_6$-catalyzed photocrosslinking of epoxysilicones, and is particularly useful when used in combination with thioxanthones.

EXAMPLES 64–67

1,5-diglycidyl naphthalene ether (DGNE) was synthesized according to a general procedure for syntheses of glycidyl ethers by reaction of alcohols with epichlorohydrin (J. Med. Chem. 1974, 17, 507) that was adapted for this purpose. 5 grams of DHN were treated with 25 ml epichlorohydrin in the presence of 0.25 gram pyridine by refluxing the reaction mixture for 12 hours. Chromatographic separation of the reaction product residues yielded the desired product as a 1/1 mix of both diasteriomers of DGNE, which was confirmed by NMR analysis.

Several photocatalyst solution, each containing ISbF$_6$, a naphthyl compound (DHN, NAGE or DGNE) and a diluent (DAA) in the relative amounts set forth below in TABLE VIII, were made. The coating compositions of Examples 35–38 were each made by blending 2 pbw of a respective one of the catalyst solutions with 100 pbw of the $M^E D_4{}^E D_{85} M^E$ epoxysilicone polymer described above. The cure speed of the compositions was determined according to the procedure set forth above in Examples 10–14. The amounts of ISbF$_6$, naphthyl additive, and diluent used in the catalyst solution and the conveyer speed results are set forth in TABLE XV below for the compositions of Examples 64–67.

TABLE XV

| Ex # | ISbF$_6{}^1$ (wt %) | Naphthyl Compound[1] | Diluent[1] | Conveyor Speed[2] (fpm) |
|---|---|---|---|---|
| 64 | 50 | — | 50 | 30 |
| 65 | 45 | 5% DHN | 50 | 45 |
| 66 | 45 | 5% NAGE | 50 | 30 |
| 67 | 45 | 5% DGNE | 50 | 37 |

[1]wt % in catalyst solution, based on the moles of iodonium salt present
[2]for coating composition consisting of 100 pbw of an epoxy silicone polymer and 2 pbw catalyst solution The results indicate that DGNE functions as an effective sensitizer for ISbF$_6$. DGNE appears to be somewhat more effective than NAGE in this system, although not quite as effective a sensitizer as DHN per cure speed determinations on the Lab Processor.

EXAMPLES 68–73 AND COMPARATIVE EXAMPLE C9

The following iodonium catalyst solutions were prepared (all amounts in parts by weight per 100 parts by weight solution):

|  | Catalyst solution A | Catalyst solution B |
|---|---|---|
| IPF$_6$ | 40 | 40 |
| diacetone alcohol reactive diluent | 40 | 40 |
| 1-chloro-4-propoxythioxanthone | 10 | 10 |
| 4-methoxy-1-naphthol | 10 | — |
| 1,4-dihydroxynaphthalene | — | 10 |

Coating baths consisting of mixtures of the naphthyl-modified epoxy silicone polymer described above in Examples 47–49 with each of the catalyst solutions A and B were then prepared; each mixture was a clear homogeneous solution which was stable for about a week stored in the dark at ambient temperature.

A coating bath consisting 100 parts of the epoxy-functional linear polydimethylsiloxane used in Examples 47–49 plus 2 parts of a catalyst solution (50 parts ISbF$_6$, 2 parts ITX and 48 parts alkylglycidyl ether diluent) was prepared as a control.

The coating compositions were applied to a Thilmany 44 lb/ream basis weight polykraft liner substrate to provide a coat weight of 1.1+/−0.1 gram/meter$^2$ using a five roll film splitting coater at a line speed of either 400 fpm or 600 fpm. Cure was effected by exposure to 1 or 2 banks of 600 watt/in power Fusion Systems 'H' lamps mounted athwart the web after the silicone was coated on it. The cured silicone coated liner was subsequently laminated with Ashland 1085 solvent-borne acrylic adhesive with a supercalendered kraft paper label stock applied atop the adhesive layer. Force required to remove the silicone/liner lamina from the PSA/face stock lamina at 180° angle and 400 inch/min. Pull speed was recorded over an 8 week period to ascertain the release stability of the UV cured silicone coatings. Results are summarized below in TABLE XVI:

TABLE XVI

| Ex # | Epoxy silicone Polymer | Catalyst solution (pbw/100 pbw polymer) | # Lamps/ Line Speed (fpm) | Release 1 day (g/2 in) | Release 2 weeks (g/2 in) | Release 8 weeks (g/2 in) |
|---|---|---|---|---|---|---|
| C9 | Control | Control | 1/600 | 27 | 26 | 29 |
| 68 | naphthyl modified | A (6 pbw) | 2/600 | 29 | 30 | 33 |
| 69 | naphthyl modified | A (4 pbw) | 1/600 | 21 | 34 | 38 |
| 70 | naphthyl modified | B (6 pbw) | 2/400 | 29 | 31 | 34 |
| 71 | naphthyl modified | B (6 pbw) | 1/600 | 33 | 36 | 38 |
| 72 | naphthyl modified | B (4 pbw) | 2/400 | 32 | 33 | 37 |
| 73 | naphthyl modified | B (4 pbw) | 1/600 | 43 | 39 | 39 |

The results show that the $IPF_6$-catalyzed naphthyl modified epoxysilicone release coatings provide comparable cure and release stability to those the $ISbF_6$-catalyzed control coating. This is surprising in that iodonium phosphates are generally known to be about an order of magnitude less effective and efficient at photocatalysis of epoxy-based coatings than analogous iodonium antimonates. These results are also significant because the phosphate-containing catalysts are less expensive and more environmentally-friendly than their antimonate analogs.

What is claimed is:

1. A radiation curable composition, comprising an epoxy-functional silicone, a photocatalyst and a cure speed-enhancing amount of a non-fluorescing polycyclic aromatic compound, said polycyclic aromatic compound comprising at least one hydroxy, alkoxy or glycidyl ether substituent bonded to an aromatic carbon atom of the compound.

2. The composition of claim 1, comprising, based on 100 parts by weight of the composition:
   from 90 parts by weight to 99.9 parts by weight of the epoxy-functional silicone, from 0.05 parts by weight to 8 parts by weight of the photocatalyst and from 0.05 parts by weight to 2 parts by weight of the non-fluorescing polycyclic aromatic compound.

3. The composition of claim 1, wherein the non-fluorescing polycyclic aromatic compound comprises one or more compounds selected from the group consisting of hydroxypentalenes, hydroxyindenes, naphthols, dihydroxynaphthalenes, alkoxynaphthols, alkoxynaphthalenes, alkoxydihydoxynaphthalenes, glycidyl naphthalene ethers, hydroxyazulenes, alkoxyazulenes, hydroxyphenanthrenes, alkoxyphenanthrenes, hydroxyanthracenes, alkoxyanthracenes, hydroxyanthrols and alkoxyanthrols.

4. The composition of claim 1, wherein the non-fluorescing polycyclic aromatic compound comprises a compound of the structural formula:

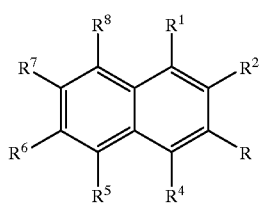

-continued

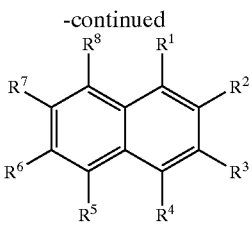

wherein $R^1$, $R^2$, $R^3$, $R^4$, $R^5$, $R^6$, $R^7$ and $R^8$ are each independently H, halo, hydroxy, alkoxy, alkylamido, monovalent glycidyl ether or monovalent hydrocarbon radical optionally substituted or interrupted by amino an oxy, provided that at least one of $R^1$, $R^2$, $R^3$, $R^4$, $R^5$, $R^6$, $R^7$ and $R^8$ is a hydroxy, alkoxy or monovalent glycidyl ether radical.

5. The composition of claim 4, wherein one or more of $R^1$, $R^2$, $R^3$, $R^4$, $R^5$, $R^6$, $R^7$ and $R^8$ is each hydroxy, one or more of $R^1$, $R^2$, $R^3$, $R^4$, $R^5$, $R^6$, $R^7$ and $R^8$ is each independently alkoxy and the remaining substituents are each independently H or alkyl.

6. The composition of claim 4, wherein one or more of $R^1$, $R^2$, $R^3$, $R^4$, $R^5$, $R^6$, $R^7$ and $R^8$ are each independently hydroxy or alkoxy, one or more of $R^1$, $R^2$, $R^3$, $R^4$, $R^5$, $R^6$, $R^7$ and $R^8$ are each alkylamido and the remaining substituents are each independently H or alkyl.

7. The composition of claim 4, wherein two or more of $R^1$, $R^2$, $R^3$, $R^4$, $R^5$, $R^6$, $R^7$ and $R^8$ are each hydroxy and the remaining substituents are each independently H or alkyl.

8. The composition of claim 4, wherein one or more of $R^1$, $R^2$, $R^3$, $R^4$, $R^5$, $R^6$, $R^7$ and $R^8$ are each independently alkoxy and the remaining substituents are each independently H or alkyl.

9. The composition of claim 4, wherein one or more of $R^1$, $R^2$, $R^3$, $R^4$, $R^5$, $R^6$, $R^7$ and $R^8$ are each independently a monovalent glycidyl ether radical and the remaining substituents are each independently H or alkyl.

10. The composition of claim 1, wherein the epoxy-functional silicone comprises one or more of:
   (i) an epoxy-functional silicone polymer or copolymer according to the structural formula (II):

$$M^E D^E_a D_M^E \qquad (II)$$

wherein:
   $M^E$ is $R^9_2 R^{10} SiO_{1/2}$;
   D is and $R^{11}_2 SiO$;
   $D^E$ is $R^{12} R^{13} SiO$;
   each $R^9$, $R^{11}$ and $R^{12}$ is independently alkyl, aryl, haloalkyl and hydroxyalkyl;
   each $R^{10}$ and $R^{13}$ is independently alkylene epoxycycloalkyl or glycidoxyalkyl; and
   a and b are each independently integers from 10 to 250, (ii) an epoxy-functional silicone polymer or copolymer according to the structural formula (III)

$$MD^E_c D_d M \qquad (III)$$

wherein:
   M is $R^{14}_3 SiO_{1/2}$;
   each $R^{14}$ is independently alkyl, aryl, haloalkyl and hydroxyalkyl,
   D and $D^E$ are each defined as above in (a), and
   c and d are each independently integers from 50 to 500, (iii) an oxo acid-modified epoxysilicone polymer or copolymer made by reaction of an epoxy-functional silicone according to formula (II) or (III) with less than its epoxy molar equivalent of one or more polyether-carboxylic acids, and (v) a polycyclic aromatic-modified epoxysilicone polymer or copolymer made by reaction of an epoxy-functional silicone according to formula according to formula (II) or (III) with less than its molar equivalent, based on epoxy functionality, of a compound selected from the group consisting of $R^{16}COOH$, $(R^{16}CO)_2O$, $R^{16}COX$, $R^{16}SO_3H$ or $R^{16}SO_2X$, wherein $R^{16}$ is a monovalent non-fluorescing polycyclic aromatic radical and X is halo.

11. The composition of claim 1, wherein the photocatalyst comprises a photocatalyst selected from the group consisting of sulfonium salts, iodonium salts and azonium salts.

12. The composition of claim 1, wherein photocatalyst comprises one or more iodonium salts.

13. The composition of claim 1, wherein photocatalyst comprises one or more of the bis(dodecyl)phenyliodonium salts of $PF_6^-$, $SbF_6^-$ or $B(C_6F_5)_4^-$.

14. The composition of claim 1, wherein the photocatalyst comprises a photocatalyst selected from the group consisting of bis(4-alkylphenyl)iodonium hexafluroantimonates, (4-octylphenyl)phenyliodonium hexafluroantimonates, and bis(4-alkylphenyl)iodonium hexaflurophosphates.

15. A radiation curable composition, comprising, based on 100 parts by weight of the composition:

(A) from 90 parts by weight to 99.9 parts by weight of an epoxy functional silicone comprising one or more of:
(i) an epoxy-functional silicone polymer or copolymer according to the structural formula (II):

$$M^E D^E_a D_b M^E \quad (II)$$

wherein:
$M^E$ is $R^9{}_2 R^{10} SiO_{1/2}$;
D is and $R^{11}{}_2 SiO$;
$D^E$ is $R^{12} R^{13} SiO$;
each $R^9$, $R^{11}$ and $R^{12}$ is independently alkyl, aryl, haloalkyl and hydroxyalkyl;
each $R^{10}$ and $R^{13}$ is independently alkylene epoxy-cycloalkyl or glycidoxyalkyl; and
a and b are each independently integers from 10 to 250, (ii) an epoxy-functional silicone polymer or copolymer according to the structural formula (III):

$$MD^E_c D_d M \quad (III)$$

wherein:
M is $R^{14}{}_3 SiO_{1/2}$;
each $R^{14}$ is independently alkyl, aryl, haloalkyl and hydroxyalkyl,
D and $D^E$ are each defined as above in (a), and
c and d are each independently integers from 50 to 500, (iii) an oxo acid modified epoxysilicone polymer or copolymer made by reaction of an epoxy-functional silicone according to formula (II) or (III) with less than its epoxy molar equivalent of one or more polyether-carboxylic acids, and (iv) a non-fluorescing polycyclic aromatic-modified epoxysilicone polymer or copolymer made by reaction of an epoxy-functional silicone according to formula (II) or (III) with less than its molar equivalent, based on epoxy functionality, of a compound selected from the group consisting of $R^{16}COOH$, $(R^{16}CO)_2O$, $R^{16}COX$, $R^{16}SO_3H$ or $R^{16}SO_2X$, wherein $R^{16}$ is a monovalent polycyclic aromatic hydrocarbon radical and X is halo;

(B) from 0.05 parts by weight to 8 parts by weight of a photocatalyst selected from the group consisting of sulfonium salts, iodonium salts and azonium salts, and (C) from 0.05 parts by weight to 2 parts by weight of a non-fluorescing polycyclic aromatic compound comprising a compound of the structural formula:

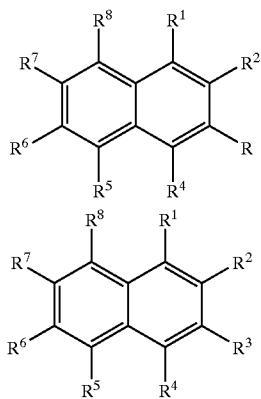

wherein $R^1$, $R^2$, $R^3$, $R^4$, $R^5$, $R^6$, $R^7$ and $R^8$ are each independently H, halo, hydroxy, alkoxy, alkylamido, monovalent glycidyl ether or monovalent hydrocarbon radical, provided that at least one of $R^1$, $R^2$, $R^3$, $R^4$, $R^5$, $R^6$, $R^7$ and $R^8$ is a hydroxy, alkoxy or monovalent glycidyl ether radical.

16. The composition of claim 15, wherein the epoxy functional silicone comprises an oxo acid modified epoxysilicone polymer or copolymer and the photocatalyst comprises a bis(alkylphenyl)iodonium hexafluorophosphate compound.

17. The composition of claim 15, wherein the epoxy functional silicone comprises an polycyclic aromatic modified epoxysilicone polymer or copolymer and the photocatalyst comprises (4-octyloxyphenyl)(phenyl)iodonium hexafluoroantimonate.

18. A coated article, comprising a substrate and a cured layer of the composition of claim 1 disposed on at least a portion of at least one surface of the substrate.

19. The article of claim 16, wherein the substrate is a paper sheet, a polymer film, a polymer coated paper sheet or a metal foil.

20. An adhesive laminate comprising a release-coated substrate, said release-coated substrate comprising a first substrate and a cured layer of the composition of claim 1 disposed on at least a portion of at least one surface of the first substrate, laminated with a pressure sensitive adhesive-coated substrate, said pressure sensitive adhesive-coated substrate comprising a layer of a pressure sensitive adhesive disposed on at least a portion of at least one surface of a second substrate, such that the cured coating layer of the release-coated substrate is in contact with the pressure sensitive adhesive layer on the pressure sensitive adhesive-coated substrate.

* * * * *

UNITED STATES PATENT AND TRADEMARK OFFICE
CERTIFICATE OF CORRECTION

| | | |
|---|---|---|
| PATENT NO. | : 6,610,760 B2 | Page 1 of 1 |
| APPLICATION NO. | : 09/908157 | |
| DATED | : August 26, 2003 | |
| INVENTOR(S) | : Richard Paul Eckberg, Kesheng Feng and Douglas Neckers | |

It is certified that error appears in the above-identified patent and that said Letters Patent is hereby corrected as shown below:

The first formula in Claim 4, lines 58-67 should be deleted.

The first formula in Claim 15, lines 12-20 should be deleted.

Signed and Sealed this

Twenty-first Day of August, 2007

JON W. DUDAS
*Director of the United States Patent and Trademark Office*